Dec. 27, 1966  MATSUO MISHIMA  3,294,458
BALL BEARING ASSEMBLIES
Filed March 27, 1964  3 Sheets-Sheet 1
FIG.1
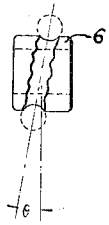
FIG.2
FIG-3
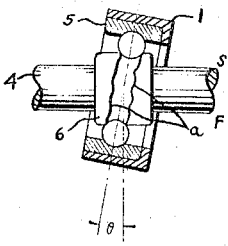
FIG-4
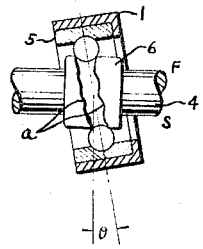
FIG-5
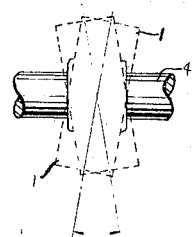
FIG-6
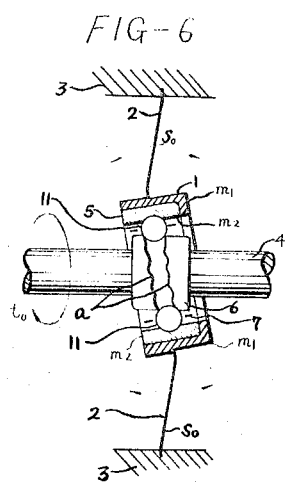
FIG.7
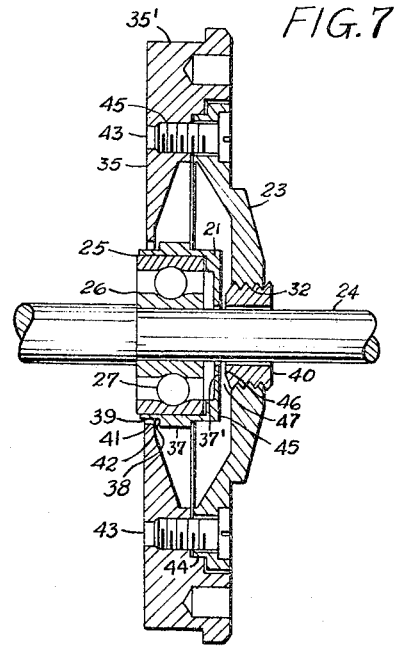
INVENTOR
MATSUO MISHIMA
BY  N. S. Leek
ATTORNEY

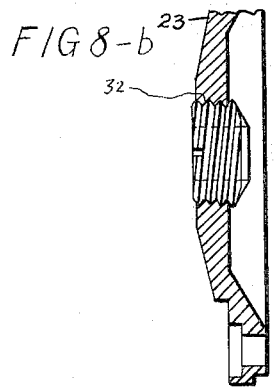
FIG 8-b
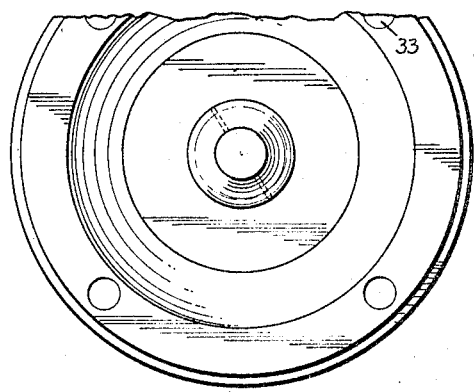
FIG 8-a
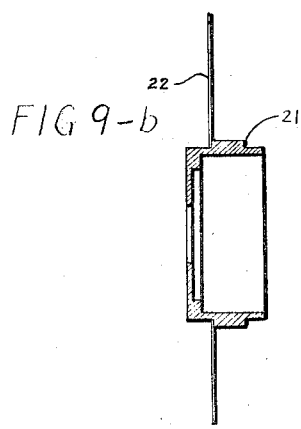
FIG 9-b
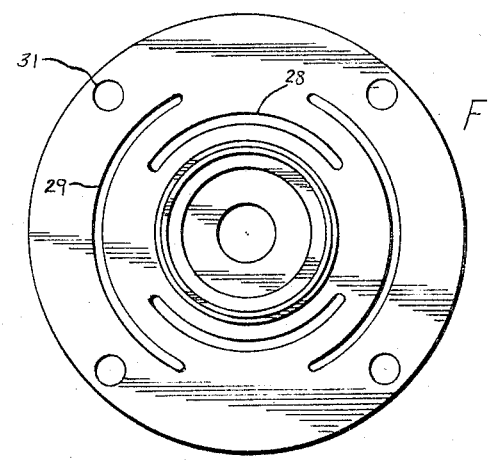
FIG 9-a
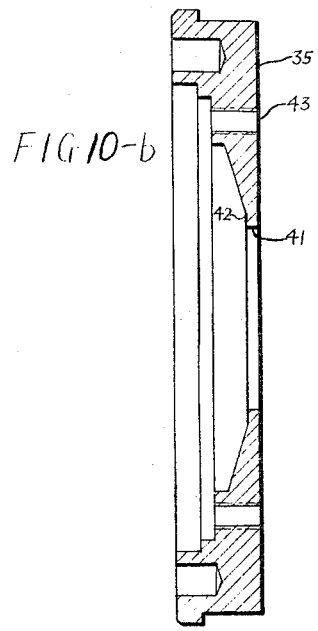
FIG 10-b
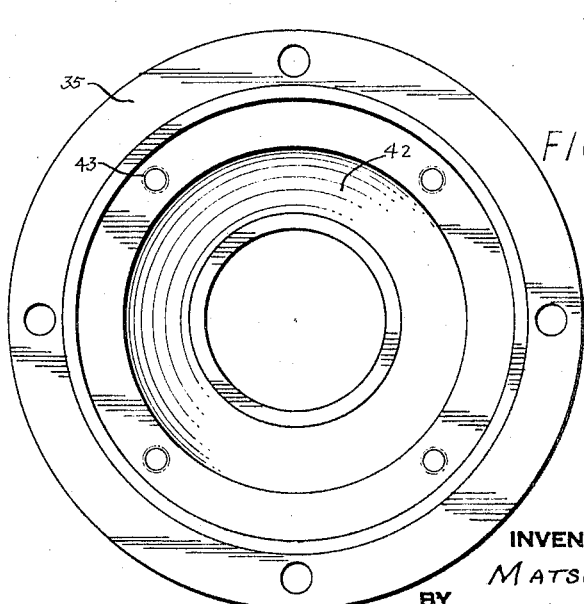
FIG 10-a Dec. 27, 1966  MATSUO MISHIMA  3,294,458
BALL BEARING ASSEMBLIES Filed March 27, 1964                                     3 Sheets-Sheet 3

INVENTOR
MATSUO MISHIMA
BY
ATTORNEY

United States Patent Office 3,294,458
Patented Dec. 27, 1966

3,294,458
BALL BEARING ASSEMBLIES
Matsuo Mishima, 23—8 6-chome, Denenchofu,
Ohta-ku, Tokyo, Japan
Filed Mar. 27, 1964, Ser. No. 355,306
8 Claims. (Cl. 308—184)

This is a continuation-in-part of my application Serial No. 69,687, filed November 16, 1960, now abandoned which in turn is a continuation-in-part of my application Serial No. 713,993, filed February 7, 1958 and now abandoned.

This invention relates to ultraminiature ball bearing assemblies of extremly low torque and high precision.

As means for eliminating shaft defects that are set up in a low torque shaft with the shaft rotation of an ultraminiature ball bearing assembly, which defects are caused by the deviations due to groove misparallelism and irregularities of the raceway forms of the inner and outer races, especially the inner race, it is proposed to support the compound member consisting of the outer race of the ball bearing and the bearing housing closely fitted thereto by means of an elastic medium, thus to allow to said compound member meridional movements for compensating the shaft defects. By doing thus, the said compound member and the elastic medium is made to constitute a movable element.

However, for ensuring that the meridional movement of said compound member for compensating the shaft defects takes place with a very small mechanical loss, it is necessary that the stiffness of the elastic medium with respect to the meridional movement be made extremely small. For this purpose, it is required that the material which makes up the elastic medium be a very thin metallic material having a high elasticity. Although it is possible by such provisions to provide the elastic medium with the required rigidity radially of the center of the shaft to cope with the torque produced thereby and its force of transmission, on the other hand, to cope with such as external forces and shocks that the shaft is subjected to, the elastic medium exceeds its limit of elastic stress, with the consequence that instances frequently occur in which the elastic medium either loses its restorative force or brakes.

It is therefore an object of this invention to provide a ball bearing assembly wherein the compound member consisting of the outer race of a ball bearing and the bearing housing is allowed with a very small loss meridional movements for compensating the shaft defects and also at the same time the assembly is such that no impairment whatsoever occurs in the shaft from external forces and shocks to which it is subjected to.

Another object of the invention is to provide a new mechanism for a ball bearing assembly of small mechanical loss, as hereinabove described.

Other objects and advantages of the present invention will be apparent from the description which follows.

The foregoing objects and advantages of this invention are achieved by a ball bearing assembly having a bearing outer race and a bearing housing closely fitted thereto, a very thin, highly elastic metallic plate supporting said bearing outer race and bearing housing, and two limiter means provided with minute clearances intervening with said bearing housing in the radial and axial directions.

Further, since the ball bearing assembly is constructed as hereinbefore described according to this invention and hence the elastic medium is not subjected to a deformation exceeding its limit of elastic force, an ultraminiature ball bearing assembly having a very high accuracy of shaft center and dynamic characteristics of extremely small mechanical loss is provided.

More particularly, the present invention concerns an ultraminiature ball bearing assembly which comprises an elastic medium to allow meridional movements to a bearing housing in which is secured a bearing outer race, a supporting means for the elastic medium for adjustably securing the outer edges of said elastic medium to a bearing holding frame so as to enable bringing the inner periphery of the bearing housing in concentric relationship with a shaft on which said bearing is mounted, a first limiter means provided at the inner side of said bearing holding frame with the intervention of minute clearances with respect to said bearing housing radially as well as axially thereof, and a second limiter means consisting of a threaded member disposed in concentric relationship with the shaft and screwed in centrally of said supporting means and adjustably with respect to the end surface of said bearing housing.

For a clearer understanding, the invention will be described with reference being had to the accompanying drawings, wherein:

FIGS. 1 to 5 are drawings shown on an exaggerated scale for facilitating the understanding of the actions resulting from the deviations due to groove misparallelism and irregularities of the raceway form of the inner race;

FIG. 6 is a sectional view showing the theoretical constitution of the movable element of the present invention;

FIG. 7 is an enlarged sectional view of an embodiment of the bearing assembly of the invention cut away along the center of the shaft;

Figure 11:
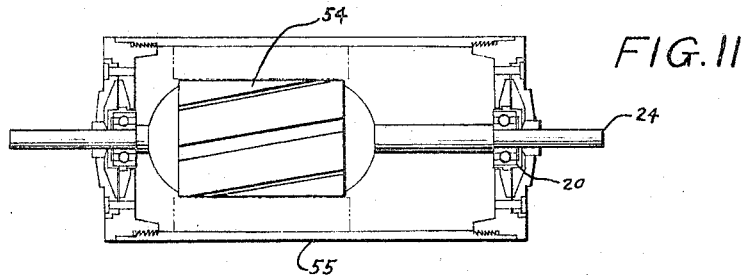
Figure 12:
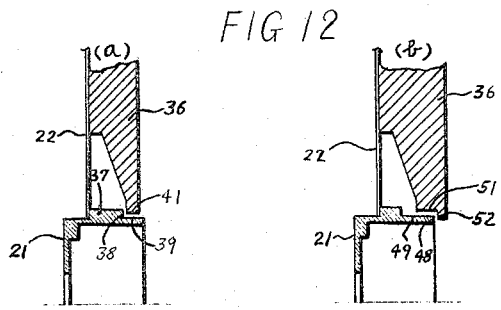
Figure 13:
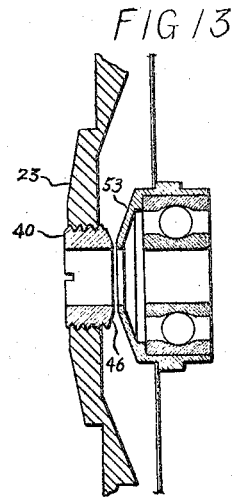

FIGS. 8–a and 8–b are enlarged plan and sectional views, respectively, of a supporting means for an elastic medium of one of the embodiments of the present invention;

FIGS. 9–a and 9–b are enlarged plan and sectional views, respectively, the elastic medium of the same embodiment referred to above;

FIGS. 10–a and 10–b are enlarged plan and sectional views, respectively, of a bearing holding frame also of the same embodiment referred to above;

FIG. 11 is an axial sectional view, on an enlarged scale, illustrating diagrammatically an ultraminiature motor to which an embodiment of the bearing assembly according to this invention has been applied;

FIG. 12–a is an enlarged sectional view showing one of the relationship between the bearing housing and the limiter means of the bearing holding frame of the same embodiment hereinbefore referred to of the present invention;

FIG. 12–b is an enlarged sectional view showing the relationship between the bearing housing and the limiter means of the bearing holding frame in another embodiment according to this invention; and FIG. 13 is an enlarged sectional view showing the relationship between a modified side of the bearing housing and the screw of the supporting means for the elastic medium, which modification is comprehended by the present invention.

FIGURE 1 is a drawing showing an inner race without deviation, and ball disposed on the periphery thereof manifests no movements whatsoever as would become an interference when this inner race is rotated.

FIGURE 2 shows the deviation due to groove misparallelism of the inner race, $\theta$ being the inclination of the groove and $a$ being the irregularity of the raceway—both enlarged and exaggerated to permit ease of understanding. Of course, these groove inclinations and irregularities of the raceway form are also seen in the outer races, however, for purpose of simplifying the explanation, we shall here describe those of the inner race which have the greatest detrimental effects on the dynamic characteristics.

FIGURE 3 shows the inclination of the outer race and that of the bearing housing closely fitted to the outer race resulting from the deviations due to groove misparallelism.

FIGURE 4 shows the positions of the outer race and bearing housing when the outer race and bearing housing as shown in FIGURE 3 are rotated 180° from the position S–F around the shaft while insuring that the outer race and bearing housing does not rotate. A further 180° rotation will return it again to the position as shown in FIGURE 3.

FIGURE 5 illustrates by the chain lines which overlap each other the path that the outer race and the bearing housing take as a result of the deviations due to groove misparallelism of the inner race during its 360° rotation around the shaft as described above. This series of movements as illustrated in FIGURE 3 to FIGURE 4 and vice versa from FIGURE 4 to FIGURE 3 that the outer race and the bearing housing closely fitted thereto take during the 360° rotation around the shaft will hereinafter be referred to as the meridional movement resulting from the deviations due to groove misparallelism of the outer race and bearing housing.

This cycle of the meridional movement of the outer race and bearing housing resulting from the deviations due to groove misparallelism of the inner race being equal to the rotation cycle of the shaft, the amplitude and frequency of an irregularity of a certain spot in the circumferential groove of the inner race becomes a function of the rate of shaft rotation obtained by multiplying the shaft rotation figure by a specific coefficient derived from the number of balls and the diameter of the raceway of the inner ring. Since the energy source which imparts this movement to the outer race and the bearing housing in accompaniment with the rotation of the shaft is converted to shaft torque, if a ball bearing having the deviations due to groove misparallelism and irregularities of the raceway form of the inner race were to be closely fitted to a conventional fixed bearing housing, the above movements of the outer race occurring as a result of the shaft rotation would be restrained. In consequence the shaft would be subjected to torsion resistance which would cause shaft defects to appear that not only would hinder the smooth rotation of a low torque shaft but also in case of electric motors would be a cause for instable power output, changes in current flow, etc. which would make the dynamic characteristics of the motor very poor.

As shown in the above FIGURE 2 to FIGURE 5, there is much difficulty involved in the machining of miniature, especially ultraminiature bearings. As has already been explained in the above, there is the matter of deviations due to groove misparallelism and irregularities of the raceway forms of the inner and outer races, especially the inner race, which causes in accompaniment with the rotation of the shaft a meridional movement in the non-rotating outer race, which movement, if resterained by fixing the outer race to a conventional rigid bearing housing, would result in shaft resistance and creation of shaft defects.

FIGURE 6 is an exaggerated and enlarged drawing for purpose of explanation showing the deviations due to groove misparallelism $\theta$ and irregularities of the raceway form of the inner race of a ball bearing. In this invention, as a means to eliminate the deviations in a miniature, especially an ultraminiature ball bearing, the outer race 5 and the bearing housing 1 closely fitted thereto is held by the elastic medium 2, the outer edges of this elastic medium being fixed to the holding frame 3, and when the shaft 4 is rotated 360°, the balls 11 move in the direction of the arrow as a result of the deviations due to groove misparallelism $\theta$ and irregularities of the raceway form $a$, and as a consequence the outer race 5 and the bearing housing 1 closely fitted thereto moves meridionally.

Thus in this invention the defects of an ultraminiature ball bearing apparatus have been eliminated by constituting a movable element.

Thus, the compound member consisting of a bearing outer race closely fitted to a bearing housing by effecting its movement with meridional freedom makes it possible to hold down the losses of the shaft during its rotation to such an extremely small loss as was hitherto impossible of attainment. The foregoing compound member is attached to the elastic medium supporting means by means of the elastic medium, and said compound member and the elastic medium constitute a movable element. In the ball bearing assembly of this invention, the effective mass $m_0$ of the compound member, which is a resultant of the mass of the bearing housing $m_1$ and the mass of the bearing outer race $m_2$, and the equivalent stiffness of the elastic medium $s_0$, which imparts meridional movements to the compound member, constitute a movable element. Furthermore, since the elastic medium makes it possible for said compound member to make meridional movements, said compound member can be made to follow faithfully and moreover at small loss the shaft defects resulting from the deviations due to groove misparallelism and irregularities of the inner race, which occur with the rotation of the shaft. Thus, the shaft defects being controlled by the stiffness of the elastic medium not only its rotation becomes exceedingly smooth but the losses that occur in the shaft during its rotation are also reduced considerably.

However, for obtaining faithful meridional movements from the compound member as described above while reducing the value of the losses of the shaft during its rotation to a minimum, an elastic medium having an extremely small elasticity, i.e., an exceedingly small stiffness, must be used. For this purpose, it is required that the elastic medium not only possess per se a small elasticity but is such that elastic deformation does not occur therein when it supports the aforesaid compound member in its correct position in a stationary state. In addition it is required that it be able to make the compound member faithfully carry out its meridional movements within the limits of the elastic deformation of the elastic medium. In order to meet this requirement, for example, a thin, metallic plate having elasticity, and particularly a thin, metallic elastic plate having suitably provided perforations symmetrically with respect to the shaft, is used. Hence, in the case of an elastic medium in which the requirement is that it possesses a small elasticity, i.e., an extremely small stiffness, its thickness inevitably become thin. Consequently, when it is used without any protective means being provided, the elastic medium would be deformed as a result of its elastic limit being exceeded due to either the external forces or the shocks. Thus, the elastic medium must be protected against shocks in the axial as well as radial direction that are ascribable to the foregoing causes by ensuring that it is held within its elastic limit.

FIG. 7 is a sectional view cut away symmetrically along the center of the bearing shaft of a bearing assembly provided with an antishock protective means for the elastic medium of the bearing assembly of this invention. A part of the reference numerals have been indictaed by adding 20 to the reference numerals of the corresponding parts shown in FIGS. 1 to 6. By constituting the bearing assembly in this manner the inner periphery of the bearing housing can be easily assembled concentric with the center of the shaft while providing minute clearances between the bearing housing and the inner side of the bearing holding frame. This bearing assembly essentially comprises an elastic medium 22 of circular shape having a bearing housing 21 secured thereto, an elastic medium supporting means 23 of circular dish shape having a hole 32 in its central part, and a bearing holding frame 35. The elastic medium is a very thin metallic plate, and is provided with suitable perforation 28, 29 symmetrical to the shaft. In its outer edge along a circular arc in concentricity with the shaft are provided a plurality of small holes 31. (See FIGS. 9–a and 9–b.)

Elastic medium supporting means 23, as shown in FIGS. 8–a and 8–b, has a larger outer diameter than that of the elastic medium 22 and is provided in its central part with a threaded hole 32 for screwing in a nut 40. On the other hand, the outer circular edge of the supporting means 23 is provided with a plurality of small holes 33 disposed along a circular arc in concentricity with the shaft and in register with holes 31.

The inner diameter 41 of bearing holding frame 35 and the outer diameter of the rim about the outer periphery of the bearing housing constitute a minute clearance. Further, the annular step 44 in concentricity with the shaft is of a larger outer diameter than the outer diameter of elastic medium, and the supporting means for elastic medium is set securely together with the outer diameter of said annular step. In addition, the bearing holding frame 35 is provided with a plurality of small holes 43 along the rectangular surface of the annular step 44, which holes are in register with the aforementioned holes 31, 33. (See FIGS. 10–a and 10–b.)

Periphery of the bearing housing 37 is provided, as shown in FIG. 12–a, with steps 38, 39 radially and axially of shaft 24. The axially disposed step 39 is formed concentric with the shaft. Inner face part 36 of the holding frame 35 at its inner annular face 41 is concentric and parallel with shaft 24. One of the perpendicular surfaces 42 adjoining annular face 41 faces to step 38. Thus, the inner face part 36 functions as a limiter means (first) and with the intervention of the minute clearances at faces 41 and 39, and faces 42 and 38 prevent the bearing housing from moving in the axial and radial directions. Screw 40 screwed into the threaded hole 32 provides between its screw end 46 and the end surface 37' of the bearing housing 21 a still another minute clearance 47. Thus, the screw 40 constitutes another limiter means (second), separate from that mentioned above, to prevent the free movement of the bearing housing axially in a direction opposite to that which the first-described limiter means limits.

In assembling the bearing assembly, the outer periphery 35' of bearing holding frame 35 and the inner periphery of bearing housing 37 are brought into perfect concentric agreement using a gauge (not shown) of high precision, then the holes 31 of the elastic medium 22 are brought into register with holes 43 of holding frame 35, following which the elastic medium supporting means 23 is overlaid and holes 33 thereof are brought into register with holes 31 and 43. The parts are then screwed securely together with cap screws 45. In order to ensure that the inner periphery of the bearing housing 21 and the shaft 24 are in concentricity in performing the assembly, it is required that the outer periphery 35' and the inner periphery of the bearing housing are in perfect concentricity. This can be accomplished by making the size of holes 31 greater than the outer diameter of cap screws 45, and the outer diameter of the elastic medium 22 smaller than the inner diameter of the annular step 44, whereby setting-up by gauge for bringing the inner periphery of the bearing housing into perfect concentricity with the outer periphery 35' will be made possible. After the foregoing operations have been performed, the bearing consisting of inner and outer races 26, 25, which has been fitted to shaft 24, is slipped into housing 21 with shaft 24 projecting beyond the central hole in the elastic medium supporting means 23, and then screw 40 is securely screwed into hole 32 axially of the shaft.

When the ball bearing assembly is completely fitted together, the bearing housing will be confronted with a first limiter means 36 with two minute clearances intervening and a second limiter means 40 with another minute clearance intervening. In consequence, the bearing housing will be limited in its freedom of movement within the bounds defined by the foregoing three minute clearances. Thus the compound member consisting of the outer race and the bearing housing closely fitted thereto effects its movements while being allowed meridional freedom within the bounds defined by these minute clearances, and the elastic medium having an extremely small stiffness, while holding down the shaft losses resulting from the rotation of the shaft to a minimum, does not make movements exceeding the limits of the these clearances. Hence, being fully protected against external forces and unwanted shocks to the shaft, deformations of the elastic medium which cannot be restored as a result of having exceeded the elastic limit do not occur and meridional movements of the aforesaid compound member are made possible.

In constituting the foregoing minute clearances, it is not necessarily required of the faces 39, 41, 38, 42, 37' and 46 which face each other that they be parallel to each other. The only requirement is that the maximum clearance in any of the directions is within the range as will allow the elastic medium to deform inside its elastic limit. FIGS. 12–b and 13 show different shapes which these minute clearances may take in the device of this invention. FIG. 12–b illustrates another form of the foregoing minute clearance in the invention being assembly in which a step is not provided on the rim of the bearing housing as in FIG. 10–a, but instead by providing on the limiter means 36 stepped faces 51 and 52 opposing the axially and radially disposed faces 49 and 48 of the bearing housing 21 thereby constituting minute clearances between the opposing faces, the elastic medium 22 is protected against the radially as well as axially directed shocks of shaft 24, hence preventing the deformation of the elastic medium beyond its elastic stress. FIG. 13, on the other hand, illustrates another embodiment in which greater resistance to shocks from the axial direction has been attained by providing the end of bearing housing 21 of the invention bearing assembly with a truncated conic-shaped face 53.

FIG. 11 shows an embodiment wherein the bearing assembly of this invention has been installed in an ultraminiature motor. Shaft 24 of a rotor 54 is supported at its two ends in bearing assemblies 20 by the means described above, while the bearing assemblies are attached to a fixed member 55 which is part of the motor frame. The precision required in such an ultraminiature motor is exceedingly high. For example, the requirements call for a clearance between the rotor and stator of 0.1 mm. and a coordinates accuracy of the shaft of 0.01 mm. The torque produced by such a motor is from 0.2 to 20 g.-cm., and when the movements for compensating the dynamic defects of a shaft resulting from groove misparallelism and irregularities of the raceways of the bearing are applied to the meridional movements of a 0.1-mm.-thick elastic medium, the stiffness of the elastic medium becomes an extremely small value of only just $$0.36 \times 10^{-7}$$

dyne-cm. Such a weak elastic medium can maintain radially of the shaft center the stiffness required for the torque porduced by the motor and its transmission. On the other hand, it is protected against the unwanted external forces and shocks by means of the hereinbefore described limiter means which the bearing housing 21 faces with clearances intervening. Therefore, it is possible to impose the previously mentioned precision requirements to motors having outputs ranging from 0.1 to several watts and to operate such motors smoothly and to operate them at 5000 r.p.m. with bearing losses as low as about 5 milliwatts.

While a variety of materials can be considered for the elastic medium, the choice should be made from those satisfying the following conditions; namely, those whose limit of elastic stress is great, those whose stiffness is extremely small, those in which deformation due to the surrounding temperature and permanent deformation do not occur, and those which can be easily worked up into thin sheets. In view of the foregoing requirements, the choice is made from the metals, as it is difficult to find nonmetals which satisfy the above conditions. However, no matter how excellent the elastic material used is, since for attaining a minimum of shaft loss the elastic medium is made thin to reduce its stiffness it is necessary to protect the elastic medium against shocks and external forces to the shaft by employment of limiter means to ensure that the movements of the medium does not exceed its limit of elastic stress. Otherwise, the medium would be deformed by shocks and external forces exceeding its elastic limit, with the consequence that loss of coordinates accuracy of the shaft center would take place or the motor would not be able to perform its given function as a result of the touch of the rotor to the stator.

Thus, as hereinbefore described, the present invention is constituted of (1) an elastic medium having an exceedingly small stiffness for eliminating the shaft defects resulting from deviations due to groove misparallelism and irregularities of inner race of an ultraminiature ball bearing driven by a minute torque, and (2) a protective means, i.e., a limiter means, for protecting the elastic medium against deformation or breakage by exceeding its elastic limit. As the elastic medium has an extremely small stiffness, it is very faithful to the meridional movements of the compound member consisting of the bearing outer race and the bearing housing to which it is fitted, and furthermore it makes it possible to hold down the shaft losses to a minimum. In addition, the limiter means by preventing the elastic medium from exceeding its elastic limit serves as means to protect it from deformation and breakage. Therefore, the bearing assembly of the present invention has very excellent features in that not only can an ultraminiature motor with an exceedingly small torque be operated with very small shaft losses, but also even when the shaft is subjected to the unwanted external forces and shocks the motor shaft fitted with the invention bearing assembly continues its normal rotation at exceedingly small losses, since the elastic medium of the bearing is fully protected by the hereinbefore described limiter means which serve as antishock means.

While I have shown and described some preferred embodiments of my invention, it will be understood that it is not to be limited to all of the details shown, but is capable of modification and variation within the spirit of the invention and within the scope of the appended claims.

What I claim is:

1. An ultraminiature ball bearing assembly comprising an elastic medium to allow meridional movements to a bearing housing in which is secured a bearing outer race, a supporting means for the elastic medium for adjustably securing the outer edges of said elastic medium to a bearing holding frame so as to enable bringing the inner periphery of said bearing housing in concentric relationship with a shaft on which said bearing outer race is mounted, a first limiter means provided at inner side of said bearing holding frame with the intervention of minute clearances with respect to said bearing housing radially as well as axially thereof, and a second limiter means consisting of a threaded member disposed in concentric relationship with the shaft, said threaded member being screwed in centrally of said supporting means and adjustably with respect to the end surface of said bearing housing.

2. A bearing assembly according to claim 1 in which said bearing housing is provided about its outer periphery with a raised portion and said first limiter means is provided with a cut-out portion opposite said raised portion.

3. A bearing assembly according to claim 1 in which said first limiter means is provided at the inner side of said bearing holding frame integrally therewith.

4. A bearing assembly according to claim 1 in which said first limiter means is provided integrally with said bearing holding frame and screw holes in register are provided in the inner side of said holding frame, in the outer edge of said elastic medium and in the supporting means for elastic medium, said screw holes in the outer edge of said elastic medium being of somewhat greater diameter than the screws to be inserted therein, whereby said bearing housing is adjustably secured to said limiter means so as to enable bringing the inner periphery of said bearing housing in concentric relationship with the shaft.

5. A bearing assembly according to claim 1 wherein the end of said housing is of truncated conic form, said truncated end facing said second limiter means.

6. A bearing assembly according to claim 1 in which said bearing holding frame and screw holes in register are provided in the inner side of said holding frame, in the outer edges of said elastic medium and in the supporting means for the elastic medium, said screw holes in the outer edge of said elastic medium being of somewhat greater diameter than the screws to be inserted therein, whereby said bearing housing is adjustably secured to said limiter means so as to enable bringing the inner periphery of said bearing housing in concentric relationship with the shaft.

7. A bearing assembly according to claim 1 in which said second limiter means is screwably fitted to the supporting means with the shaft extending therethrough with a minimum clearance therebetween providing for a slight movement of said shaft.

8. A bearing assembly according to claim 1 in which the inner surface area of said second limiter means facing said bearing housing is reduced to minimum.

References Cited by the Examiner

UNITED STATES PATENTS

| | | | |
|---|---|---|---|
| 2,550,908 | 5/1951 | Bryant et al. | 308—178 |
| 2,874,008 | 2/1959 | Orte et al. | 308—184 |

MARTIN P. SCHWADRON, *Primary Examiner.*

FRANK SUSKO, *Examiner.*